(12) United States Patent
Pampalk et al.

(10) Patent No.: US 8,117,214 B2
(45) Date of Patent: Feb. 14, 2012

(54) MUSIC ARTIST RETRIEVAL SYSTEM AND METHOD OF RETRIEVING MUSIC ARTIST

(75) Inventors: Elias Pampalk, Tsukuba (JP);
Masataka Goto, Tsukuba (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 126 days.

(21) Appl. No.: 12/444,258

(22) PCT Filed: Oct. 5, 2007

(86) PCT No.: PCT/JP2007/069549
§ 371 (c)(1),
(2), (4) Date: May 20, 2009

(87) PCT Pub. No.: WO2008/041764
PCT Pub. Date: Apr. 10, 2008

(65) Prior Publication Data
US 2010/0042664 A1 Feb. 18, 2010

(30) Foreign Application Priority Data
Oct. 5, 2006 (JP) .................................. 2006-274441

(51) Int. Cl.
*G06F 17/30* (2006.01)
(52) U.S. Cl. ......................... 707/750; 707/736; 709/203
(58) Field of Classification Search .................. 707/736, 707/750; 709/203
See application file for complete search history.

(56) References Cited

U.S. PATENT DOCUMENTS

| 7,752,204 | B2* | 7/2010 | Kao et al. ....................... 707/736 |
| 2005/0038819 | A1* | 2/2005 | Hicken et al. .............. 707/104.1 |

(Continued)

FOREIGN PATENT DOCUMENTS

JP  02-059980  2/1990

(Continued)

OTHER PUBLICATIONS

Pohle et al., "Generating Similarity-Based Playlists Using Traveling Salesman Algorithms", 2005, Proc. of the 8th Int. Conference on Digital Audio Effects, pp. 1-6.*

(Continued)

*Primary Examiner* — Charles Kim
*Assistant Examiner* — Alan Graham
(74) *Attorney, Agent, or Firm* — Rankin, Hill & Clark LLP

(57) ABSTRACT

The present invention provides a music artist retrieval system which makes it possible for users to automatically retrieve an unknown music artist similar to the user's favorite artist while actually reproducing and confirming a piece of music of the unknown artist. A music artist similarity map storing section (13) computes a plurality of similarities for a plurality of music artists and makes a music artist similarity map for the plurality of music artists based on the plurality of similarities, then stores the music artist similarity map. Here, the similarities are computed between one of the plurality of music artists and the other music artists based on features of the respective music artists. A similar artists selecting and displaying section (17) displays on a display plurality of indications related to one music artist and two or more music artists whose similarities are close to the one music artist, based on the music artist similarity map. A music data playing section (19) reproduces music data of a music artist related to a selected artist indication when a play command is inputted.

7 Claims, 13 Drawing Sheets

U.S. PATENT DOCUMENTS

| | | |
|---|---|---|
| 2005/0241463 A1 | 11/2005 | Urata |
| 2006/0112098 A1* | 5/2006 | Renshaw et al. .................. 707/7 |
| 2006/0217962 A1 | 9/2006 | Asano |
| 2006/0259464 A1* | 11/2006 | Szczublewski et al. .......... 707/3 |

FOREIGN PATENT DOCUMENTS

| | | |
|---|---|---|
| JP | 2002-215632 | 8/2002 |
| JP | 2003-271160 | 9/2003 |
| JP | 2004-046575 | 2/2004 |
| JP | 2005-018205 | 1/2005 |
| JP | 2005-276400 | 10/2005 |
| JP | 2005-301921 | 10/2005 |
| JP | 2006-251866 | 9/2006 |

OTHER PUBLICATIONS

Pampalk et al., "MusicRainbow: A New User Interface to Discover Artists Using Audio-based Similarity and Web-based Labeling", 2006, ISMIR International Conference on Music Information Retrieval, pp. 1-4.*

* cited by examiner

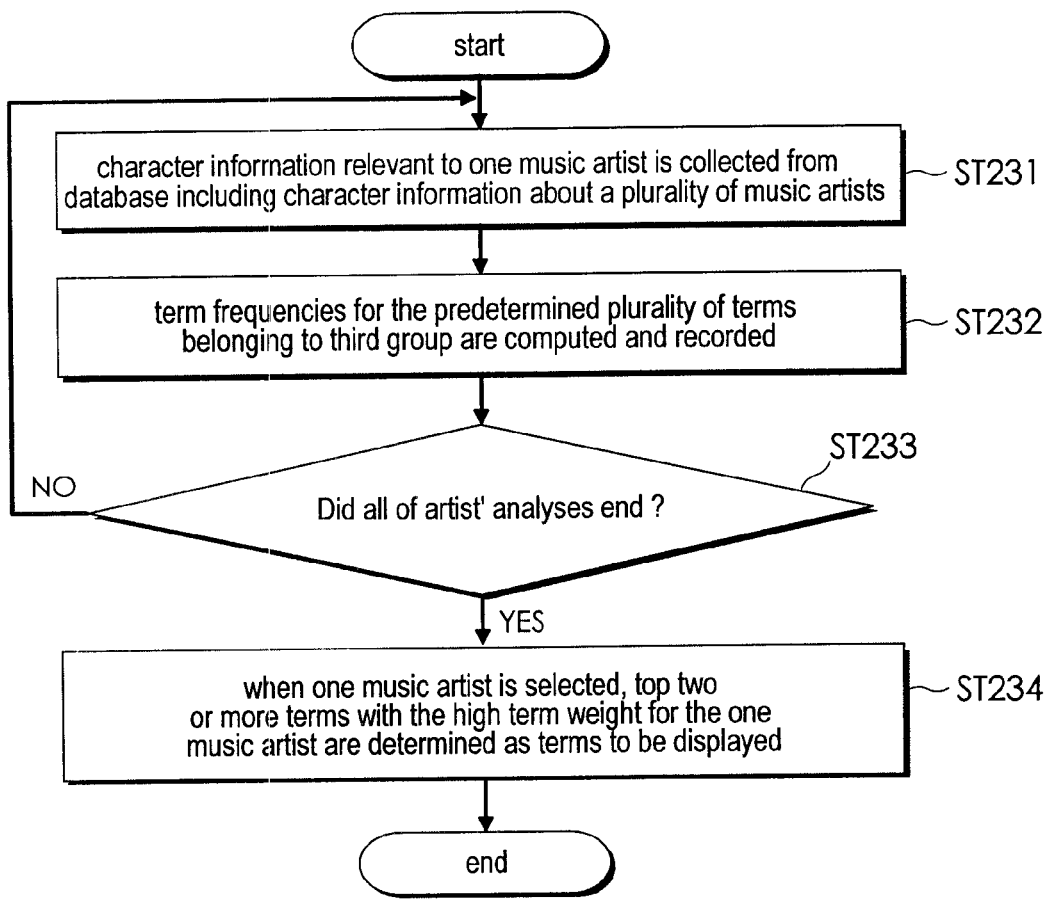

MUSIC ARTIST RETRIEVAL SYSTEM AND METHOD OF RETRIEVING MUSIC ARTIST

TECHNICAL FIELD

The present invention relates to a music artist retrieval system in which users can retrieve an unknown music artist similar to their favorite music artist, a method of retrieving music artist, a program for retrieving a music artist used in the system, and a computer-readable recording medium in which the program is recorded.

BACKGROUND ART

An art of retrieving an unknown music piece similar to user's favorite music piece is disclosed in Japanese Patent Publication No. 2004-46575 (refer to Patent Reference 1).

Another art of retrieving a music pieces in tune with user's taste more appropriately from among a lot of music pieces is disclosed in Japanese Patent Publication No. 2005-18205 (Patent Reference 2).

Another art is disclosed in Japanese Patent Publication No. 2005-276400 (Patent Reference 3), with regard to a music contents playing apparatus in which music is automatically selected and played successively to prevent users from being bored even after repeatedly used.

Furthermore, an art of retrieving information on a music which is currently played around, such as title of the music, player's name and so on using a mobile terminal is disclosed in Japanese Patent Publication No. 2002-215632 (Patent Reference 4).

Also, conventionally, unknown artists can be searched through many music artists in such a manner as reading recommendation information of the music artist or having a view of a similar music artist through amazon.com or allmusic.com to search for a desired music artist.

[Patent Reference 1] Japanese Patent Publication No. 2004-46575

[Patent Reference 2] Japanese Patent Publication No. 2005-18205

[Patent Reference 3] Japanese Patent Publication No. 2005-276400

[Patent Reference 4] Japanese Patent Publication No. 2002-215632

SUMMARY

However, there have been neither a system nor method by which a user can automatically retrieve an unknown artist similar to his/her favorite artist in the prior art.

An object of the present invention is to provide a music artist retrieval system in which a user can automatically retrieve an unknown music artist similar to his/her favorite music artist while actually reproducing or playing and confirming the retrieved music, a method of retrieving music artist, a program to be used in the system, and a computer-readable recording medium in which the program is recorded.

Another object of the present invention is to provide a music artist retrieval system in which a user can select an unknown artist from among a plurality of similar artists, a method of retrieving music artist, a program to be used in the system, and a recording medium.

A further object of the present invention is to provide a music artist retrieval system in which a user can retrieve an unknown artist based on features of the music pieces for each of the music artists, a method of retrieving music artist, a program to be used in the system, and a recording medium.

Still another object of the present invention is to provide a music artist retrieval system in which not only a name of an artist to be retrieved but also term data corresponding to the music artists are displayed, a method of retrieving music artist, a program to be used in the system, and a recording medium.

Another object of the present invention is to provide a music artist retrieval system in which user can retrieve an unknown music artist, based on his/or her intuitive recognition on a genre of music for selectable artists, a method of retrieving music artist, a program to be used in the system and a recording medium.

Means of Solving the Problems

A music artist retrieval system of the present invention includes a music artist similarity map storing section, a music data storing section, a similar artists selecting and displaying section, and a music data playing section. The music artist similarity map storing section computes a plurality of similarities for a plurality of music artists, the similarity being computed between one of the plurality of music artists and other music artists based on features of the music artists, and creates a music artist similarity map for the plurality of music artists based on the plurality of similarities computed and stores the music artist similarity map. Here, the music artist similarity map is created based on the similarities of the plurality of music artists to indicate mutual distances or similarity relation between one of the plurality of music artists and other music artists.

More specifically, the music artist similarity map storing section includes a similarity computing section, a map creating section, and a map storing section that stores the music artist similarity map created by the map creating section. The similarity computing section computes the similarity between one of the music artists and another one of the music artists based on distances between the plurality of music data for the one music artist and the plurality of music data for the other one music artist. How to compute the similarity based on the distances is disclosed in publicly known disclosures such as Japanese Patent Publication No. 2003-76717 and Japanese Patent Publication No. 2004-333605 for example. How to compute the similarity between music data is also shown in Japanese Patent; Publication No. 2006-146729 and so on. In the present invention is employed a similarity computing method as follows. Namely, the similarity computing section computes a first average value by averaging a plurality of shortest distances measured from each of the plurality of music data for the one music artist to the plurality of music data for the other one music artist. Then, the similarity computing section computes, as well as, a second average value by averaging a plurality of shortest distances measured from each of the plurality of music data for the other one music artist to the plurality of music data for the one music artist, and then determines a larger one of the first and the second average values as the similarity between the one music artist and the other one music artist. When the similarity is computed in such a manner, it is possible to comprehensively obtain distances between each of the plurality of music data for the one music artist and each of the plurality of music data for the other music artist, and moreover, the similarity between the music artists is available with high precision.

The map creating section creates the music artist similarity map based on the plurality of similarities for the plurality of music artists computed by the similarity computing section. How to make the map is arbitral. For one concrete example, the map creating section creates the map so that the plurality of similarities computed for the plurality of music artists may have a relationship unicursally drawn in one continuous line according to a traveling salesman algorithm. Such music artist similarity map constitutes a closed loop so as to make it possible to reach a desired music artist without fail either when retrieval is proceeding in a forward direction or a backward direction, thereby simplifying the retrieval operation.

The above-mentioned music data storing section stores a plurality of music data for each of the plurality of music artists. Since the plurality of music data are stored for each of the plurality of music artists, the computation accuracy for computing the above-mentioned similarities is increased, two or more pieces of music can be played during an operation, and convenience is enhanced. It is not necessary that music data to be used in computing the similarity and music data to be played or reproduced are the same one. In playing the music data, it is allowed to play just one piece of music, or even a part of one piece of music.

The similar artists selecting and displaying section selects, when one music artist is selected from among the plurality of music artists, a plurality of music artists whose similarities are close to the similarity of the one music artist, based on the music artist similarity map, and displays on a display a plurality of artist indications corresponding to the one music artist and the plurality of music artists whose similarities are close to the similarity of the one music artist. Since the similar artists selecting and displaying section has a function to display on the display the plurality of artist indications corresponding to the one music artist and the plurality of music artists whose similarities are close to the similarity of the one music artist, a user can encounter an unknown music artist similar to the one music artist. Since selection of the two or more music artists whose similarities are close to the similarity of the one music artist is executed based on the music artist similarity map, it becomes possible for the system to automatically retrieve a similar music artist without manual operation. A typical example of the artist indication may comprise a name of an artist, which may be any of a full name, a nickname or an abbreviated name. In addition, the artist indication may comprise a picture, a portrait and so on, of the artist. Furthermore, the artist indication may comprise an identification number if a list showing a relation of artist's name and the identification number is prepared separately. The number of the plurality of artist indications to be displayed is arbitrarily determined. Normally, it is limited to an extent that the user can recognize the contents of the plurality of artist indications, depending on the screen size of the display. A design for displaying the artist indications is arbitrary. For example, the plurality of indications may be displayed on the screen in a row which vertically extends or transversely extends on the screen. The artist indications on the screen may be changed so that the page is turned over, or by scrolling the screen.

It is necessary to display the plurality of artist indications on the screen at a startup of the system to allow the user to select one music artist. Accordingly, the similar artists selecting and displaying section may include an initial selecting section that initially selects one predetermined or randomly-selected music artist from among the plurality of music artists at a startup of the system. It should be noted that after initially displaying the artist indications of the predetermined or randomly-selected one music artist and two or more music artists similar to the one music artist, the one music artist who was selected last in the initial operation of the system may be determined to be one music artist to be selected at the beginning in the next operation of the system.

More specifically, the similar artists selecting and displaying section further includes a specific artist selecting section in addition to the initial selecting section. The specific artist selecting section determines, when one artist indication is selected with an operation of an operator from among the plurality of artist indications displayed on the display after the initial selecting section has initially selected the one music artist, one music artist corresponding to the one selected artist indication as the one music artist selected from among the plurality of music artists. Selection means operated by an operator is arbitral. For example, a cursor or pointer may be used for selection. A special rotary selecting section equipped with a rotary knob turned by the operator may be used for the selection. The rotary selecting section may be constructed as to output command signals which select sequentially artist indications from among the plurality of indications displayed on the display which are arranged in a select direction that is determined depending on a turning direction of the knob, when the rotary knob is turned. The selection result may be shown in such a manner that the selected artist indication is always displayed on a specific position, or that the display of the selected artist indication is made to differ from the display of the remaining artist indications. For example, the display of the selected artist indication may be different in brightness or color from that of the others, or it may be made to blink.

As mentioned above, although the display of the artist indications is arbitrary, a scroll display section is convenient even when the display screen is small. The scroll display section, when the initial selecting section or the specific artist selecting section selects one music artist, scrollably displays on the display the plurality of artist indications corresponding to the one music artist and the plurality of music artists whose similarities are close to the similarity of the one music artist. In the present specification, "scrollably displays" means an operation that, when an artist indication adjacent to the currently-selected artist indication is selected, an artist indication displayed at one end of the plurality of indications arranged in a row on the display disappears, and a new artist indication appears at the other end thereof. The scroll display section makes it possible for a user to see a vast amount of artist indications easily even when the display screen is small.

The retrieval system of the present invention further includes the music data playing section. The music data playing section extracts, when one of the plurality of indications displayed on the display is selected and then a play command is inputted, at least one music data of the music artist corresponding to the selected artist indication from among the plurality of music data stored in the music data storing section and plays the at least one music data. How to generate or input the play command is arbitrary. For example, the play command may be generated or inputted synchronizing with displaying the selected one artist indication by the similar artists selecting and displaying section. In this manner, whenever the one artist indication is selected, a music data of the music artist corresponding to the one artist indication is always being played. The play command may be inputted from another input section after the one artist indication has been selected. For example, if the above-mentioned specific artist selecting section includes the rotary selecting section with a push switch structure, the push switch structure may be built in the rotary selecting section and a key top of the push switch structure may be used as the knob of the rotary selecting section. With such configuration, selection of an artist indication is available by turning the knob, and the play command can be inputted by pushing the knob. It should be noted that a special input device may be employed for inputting a play command.

In the music artist retrieval system according to the present invention, together with one artist indication corresponding to the one music artist selected by the operator, other artist indications corresponding to the music artists similar to the one music artist are displayed on the display automatically and selectively. Therefore, retrieval of unknown music artists similar to user's favorite artist is easy. In addition, since the music data playing section makes it possible to play and confirm music of retrieved unknown artists immediately, it is extremely convenient.

Terms relevant to information useful for retrieval may be displayed on the display in addition to the artist indications in order to make the selecting operation easily. Example of such useful information includes a genre of music or gender of music artists, and other information such as whether it is a solo or group. To make it possible to display such information, the retrieval system may further include a term data storing section and a relevant term display section. The term data storing section obtains term data by computing, for each of the plurality of music artists, a term frequency or a term weight defined on the basis of the term frequency in respect of a plurality of predetermined terms in connection with artists and music pieces, picked up from among a plurality of character information data regarding the plurality of music artists and stores the term data corresponding to the plurality of music artists mapped to the music artist similarity map. Any type of character information data may be useful including data collected through the Internet. Since data collected through the Internet is an electronic data, the data can be readily analyzed and is very convenient. Any term is available as the predetermined plurality of terms if only it is useful in retrieving an unknown music artist. However, some terms in the plurality of terms are very important in retrieving a music artist such as genre of music, and others are not so useful in retrieving thereof such as artist's nationality. Accordingly, if the plurality of terms is all analyzed without considering indication term weight, unnecessary analysis work may increase. To prevent such problem, it is preferred that the predetermined plurality of terms is divided into two or more groups according to their weights (importance) as will be described later.

Various kinds of known technique of keyword extraction may be used to extract and predetermine the plurality of terms from among the character information data. As a matter of course, TFIDF method etc. may be used for extraction and determination of such terms. The TFIDF method is a well-known key word extraction method, in which term weight is computed based on term frequency and the obtained term weight is used for extraction.

The relevant term display section displays on the display a term closely associated with the one music artist based on the term data regarding the one music artist stored in the term data storing section in such a manner that the term displayed on the display may be identified as being associated with the one music artist, when the initial selecting section or the specific artist selecting section selects the one music artist. In the present specification, the "a term closely associated with the one music artist" is defined in view of whether or not the term is useful in retrieving artists. If data of term frequency and term weight computed based on the term frequency is already prepared for the plurality of terms, it is the most suitable for the purpose to display top two or more terms with the high term frequency or with the high term weight. The "a manner that the term displayed on the display may be identified as being associated with the one music artist" is a manner in which the term on the display is displayed showing some relationship with the artist indication of the one music artist.

For example, when the brightness of the selected artist indication is higher than the brightness of other artist indications, the brightness of the term closely associated with the one music artist may be also highlighted. For another example, the relationship of the term and the one music artist may be shown by displaying both of them in the same color, or making the term to blink. When the above-mentioned display manners are adopted, the top two or more terms having the high term frequency or the high term weight among the plurality of terms may be displayed in advance on the display as auxiliary information available for operator as a decisive factor. In this manner, then, a certain term may be highlighted, differently colored or made to blink to help the operator understand that it is a term related to the one music artist. If the terms including the auxiliary information can be used in retrieving a music artist, retrieval operation becomes easy.

More practically, it is preferred that the term data storing section stores at least the term data relating to a plurality of terms belonging to a first group, which are considered to be important as a decisive factor in selecting a music artist, and the term data relating to a plurality of terms belonging to a second group, which are considered to be less important than the plurality of terms belonging to the first group but may be usable as a decisive factor. In this case, the relevant term display section may have a function to display top two or more terms having the term frequency or the term weight which is higher than those of other terms among the plurality of terms belonging to the first group as well as top two or more terms having the term frequency or the term weight which is higher than those of other terms among the plurality of terms belonging to the second group. Relationship of a relevant term and the one music artist may be shown by increasing brightness of the relevant term, or making it blink.

If the terms are divided into two groups, that makes it possible to display terms in groups on a display. For example, the map creating section creates the music artist similarity map so that the plurality of similarities computed for the plurality of music artists may have a relationship unicursally drawn in one continuous line according to a traveling salesman algorithm. In addition, it is preferred that the system further includes a pseudo-map graphic display section. The pseudo-map graphic display section displays on the display a closed-loop pseudo-map graphic in which positions corresponding to the plurality of music artists are mapped based on the music artist similarity map. The pseudo-map graphic display section is also configured to moves the pseudo-map graphic in conjunction with a movement of the plurality of artist indications displayed by the similar artists selecting and displaying section so that a display position of the artist indication of the selected one music artist displayed on the display may always be consistent with a position of the selected one music artist mapped to the pseudo-map graphic. The relevant term display section is configured to display the top two or more terms having the high term frequency or the high term weight among the plurality of terms belonging to the first group as well as the top two or more terms having the high term frequency or the high term weight among the plurality of terms belonging to the second group, in the vicinity of the pseudo-map graphic in consideration of the positions of the plurality of music artists mapped to the pseudo-map graphic, and to move the display of the term in conjunction with the movement of the pseudo-map graphic. With such pseudo-map graphic display section and relevant term display section, it is possible to display both of the plurality of terms used as auxiliary information in retrieving artists and terms closely associated with the selected artist indication on the display, in synchronization with selecting the artist indication or changing or renewing artist indications on the display, in addition to the artist indications. As a result, it is possible for a user to retrieve a desired unknown music artist in a short time from among vast amounts of music artists using as reference the plurality of terms displayed on the display.

The closed-loop pseudo-map graphic in which positions of the plurality of music artists are mapped may be circular, elliptical, or polygonal in shape. Because positions of the plurality of music artists are mapped to the pseudo-map graphic, the position of one artist indication selected from among the plurality of artist indications can always be consistent with a position of the selected one music artist mapped to the pseudo-map graphic. More specifically, it becomes possible to move the pseudo-map graphic so that the position of the music artist corresponding to the selected artist indication, which is mapped to the pseudo-map graphic, may be located side by side with the selected artist indication shown on the display. Further, since the top two or more terms having the high term frequency or the high term weight selected among the plurality of terms belonging to the first and second groups are displayed in the vicinity of the pseudo-map graphic in such a manner that the terms moves in conjunction with the movement of the pseudo-map graphic, it becomes possible to always keep a display position of a relevant term for the selected artist indication to help the user recognize that the term is related to the selected artist indication. As a result, retrieval operation becomes much easier.

The closed-loop pseudo-map graphic may comprise concentrically disposed circle indications of which the number is the same as the number of the top two or more terms belonging to the first group. In this case, it is preferred that the top two or more terms corresponds to the two or more concentrically disposed circle indications, respectively. Further, the pseudo-map graphic display section is configured to implement the following two functions. The first function is to smooth the term frequencies or the term weights for the top two or more terms and classify them into a plurality of levels and construct the circle indications corresponding to the terms from a plurality of segment regions corresponding to the plurality of levels. The second function is to indicate the plurality of levels by using a different brightness and/or chromaticity for each segment region. With such pseudo-map graphic display section having the first and second functions, a level of the term frequency or the term weight for each of the top two or more terms, which are belonging to the most important first group, can be confirmed visually by way of the difference in brightness and/or chromaticity across the two or more segment regions. As a result, even when the pseudo-map graphic and the displayed terms are moved in conjunction with the renewal or change of the artist indications to be displayed, the user can do the retrieval operation while recognizing the position of a desired music artist by way of positions of the segment regions constituting the circle indication. As a result, change operation of the artist indications (moving operation of the indications) can be speedy.

The term data storing section may further store term data regarding the term frequency or the term weight computed for a plurality of terms belonging to a third group, which are considered to be associated with the plurality of music artists. In this case, the relevant term display section may display a term associated with the one selected music artist as a reference term on the display separately from terms belonging to the first and second groups, based on the term data of the plurality of terms belonging to the third group. In this manner, it is possible to retrieve a desired unknown music artist referring indication to the plurality of auxiliary terms belonging to the third group.

A method of retrieving a music artist of the present invention comprises the steps of making and storing music artist similarity map, storing music data, selecting and displaying similar artists, and playing music data. In the step of making and storing music artist similarity map, a plurality of similarities for a plurality of music artists are computed between one of the plurality of music artists and other music artists based on features of the music artists. A music artist similarity map for the plurality of music artists are created based on the plurality of similarities. Then, the music artist similarity map is stored in a music artist similarity map storing section. In the step of storing music data, a plurality of music data for each of the plurality of music artists are stored into a music data storing section. In the step of selecting and displaying similar artists, when one music artist is selected from among the plurality of music artists, a plurality of music artists whose similarities are close to the similarity of the one music artist are selected based on the music artist similarity map, and plurality of artist indications corresponding to the one music artist and the plurality of artists whose similarities are close to the similarity of the one music artist are displayed on a display. In the steps of extracting music data and playing the music data, when one of the plurality of artist indications displayed on the display is selected and a play command is inputted, at least one music data of the music artist corresponding to the selected artist indication is extracted from the plurality of music data stored in the music data storing section and the at least one music data is played.

The step of making and storing music artist similarity map may comprises: a step of computing the similarity between one of the music artists based on distances between the plurality of music data for the one music artist and the plurality of music data for the other one music artist; a step of creating the music artist similarity map based on the plurality of similarities for the plurality of music artists computed in the step of computing similarity; and a step of storing the music artist similarity map creating in the step of creating the music artist similarity map in a map storing section.

Preferably, in the step of computing the similarity, a first average value is computed by averaging a plurality of shortest distances measured from each of the plurality of music data for the one music artist to the plurality of music data for the other one music artist; a second average value is computed by averaging a plurality of shortest distances measured from each of the plurality of music data for the other one music artist to the plurality of music data for the one music artist; and then a larger one of the first and the second average values is determined as the similarity between the one music artist and the other one music artist.

In the step of creating the music artist similarity map, the music artist similarity map is created so that the plurality of similarities computed for the plurality of music artists may have a relationship unicursally drawn in one continuous line according to a traveling salesman algorithm.

Preferably, the step of selecting and displaying similar artists comprises a step of initially selecting a predetermined or randomly-selected one music artist from among the plurality of music artists at a startup of system; a step of determining, when one artist indication is selected with an operation of an operator from among the plurality of artist indications displayed on the display after the one music artist has initially been selected in the step of initially selecting, one music artist corresponding to the one selected artist indication as the one music artist selected from among the plurality of music artists; and a step of scrollably displaying on the display the plurality of artist indications corresponding to the one music artist and the plurality of music artists whose similarities are close to the similarity of the one music artist when the one music artist has been selected in the step of initially selecting step or in the step of determining the one music artist.

Preferably, the method of retrieving a music artist further comprises: a step of storing term data into a term data storing section corresponding to the plurality of music artists mapped to the music artist similarity map, the term data being obtained by computing, for each of the plurality of music artists, a term frequency or a term weight defined on the basis of the term frequency in respect of plurality of predetermined terms in connection with artists and music pieces, picked up from among a plurality of character information data regarding the plurality of music artists; and a step of displaying on the display a term closely associated with the one music artist based on the term data regarding the one music artist stored in a term data storing section in such a manner that the term displayed on the display may be identified as being associated with the one music artist, when the one music artist is selected in the step of initially selecting one music artist or in the step of determining one specific music artist.

Furthermore, a program for retrieving a music artist according to the present invention is configured to cause a computer to execute the above-mentioned steps. It is needless to say that the program of the present invention may be stored in a computer-readable recording medium.

BRIEF DESCRIPTION OF THE DRAWINGS

FIG. 13 is a flowchart for determining a term from among a plurality of terms belonging to a third group to be displayed on the display.

DETAILED DESCRIPTION

Figure 1A:
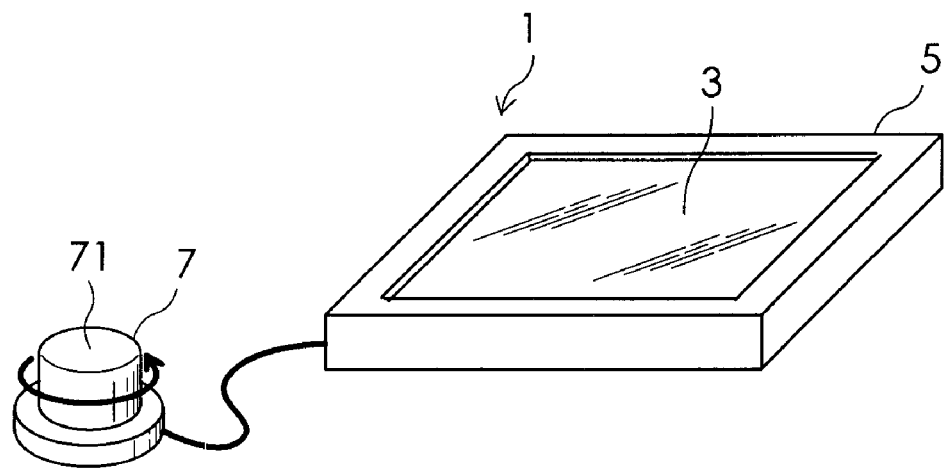
FIGS. 1A and 1B are perspective views showing an external appearance of two kinds of hardware when the present invention is applied to a portable music artist retrieval system.
Figure 1B:
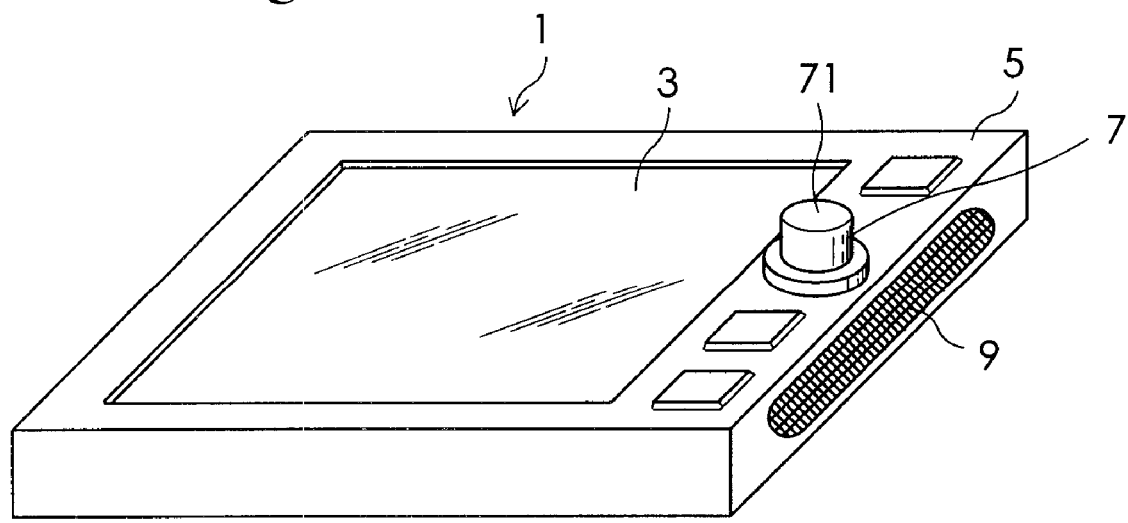

The following describes one embodiment of a music artist retrieval system and method of retrieving music artist according to the present invention with reference to the drawings. FIGS. 1A and 1B are perspective views showing an external appearance of two types of hardware 1 wherein the present invention is applied to a portable music artist retrieval system. In FIG. 1A, the hardware 1 is provided with a rotary selecting section 7 separately from a main unit 5 equipped with a display 3. In the hardware 1 shown in FIG. 1B, the rotary selecting section 7 is equipped with the main unit 5 including the display 3. The hardware 1 shown in FIG. 1B includes a sound generation portion 9 of a speaker at a side of the main unit 5. The rotary selecting section 7 includes a knob 71 rotated by an operator and also contains a push switch structure in which the knob 71 is used as a keytop. The knob 71 is rotated for selecting one artist indication as will be hereinafter described, and pushed down for reproducing a sound data.

Figure 2:
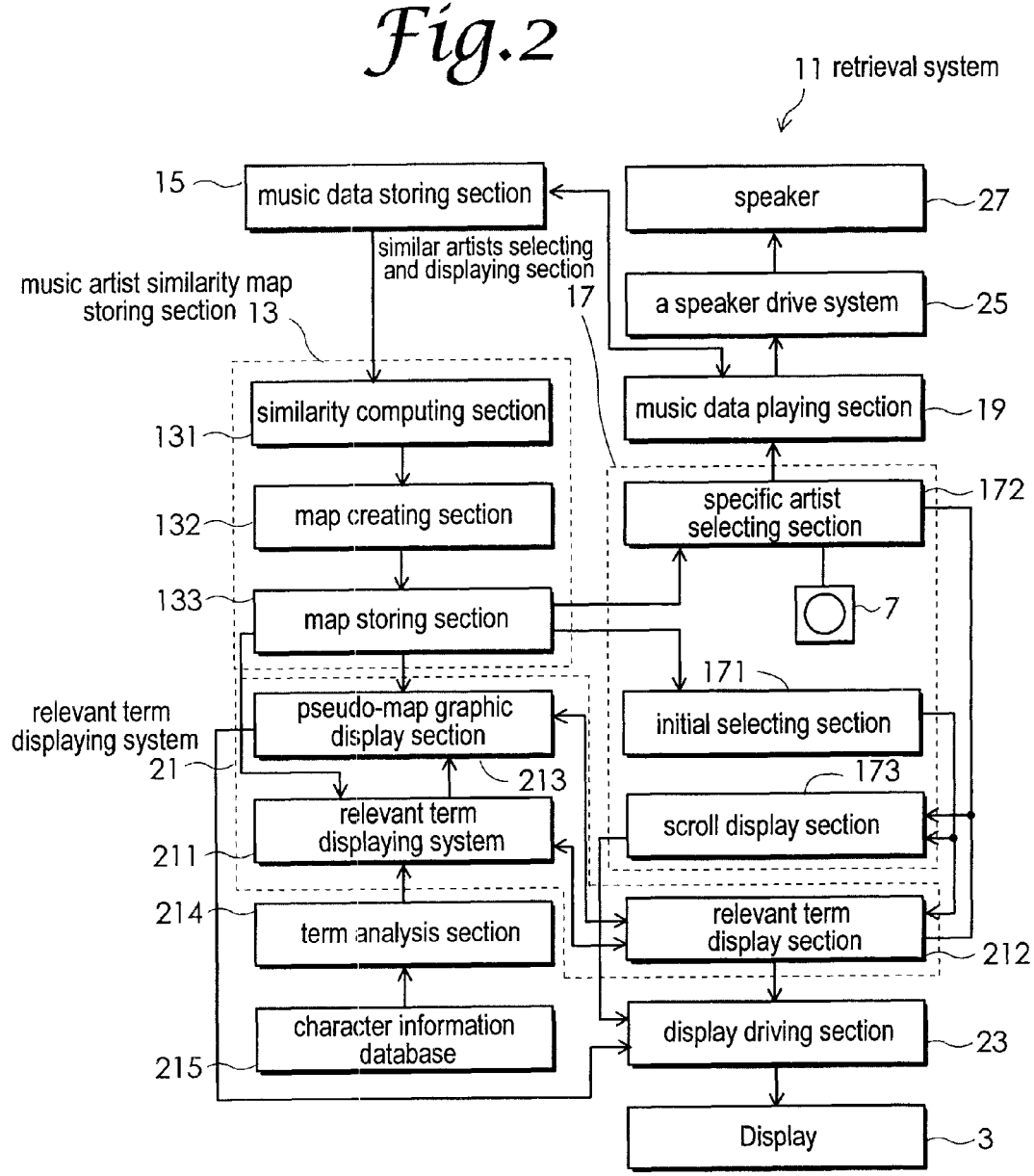
FIG. 2 is a block diagram showing a construction of principal portion and other relevant sections of a retrieval system constructed in a main unit of the music artist retrieval system according to the present embodiment.
Figure 3:
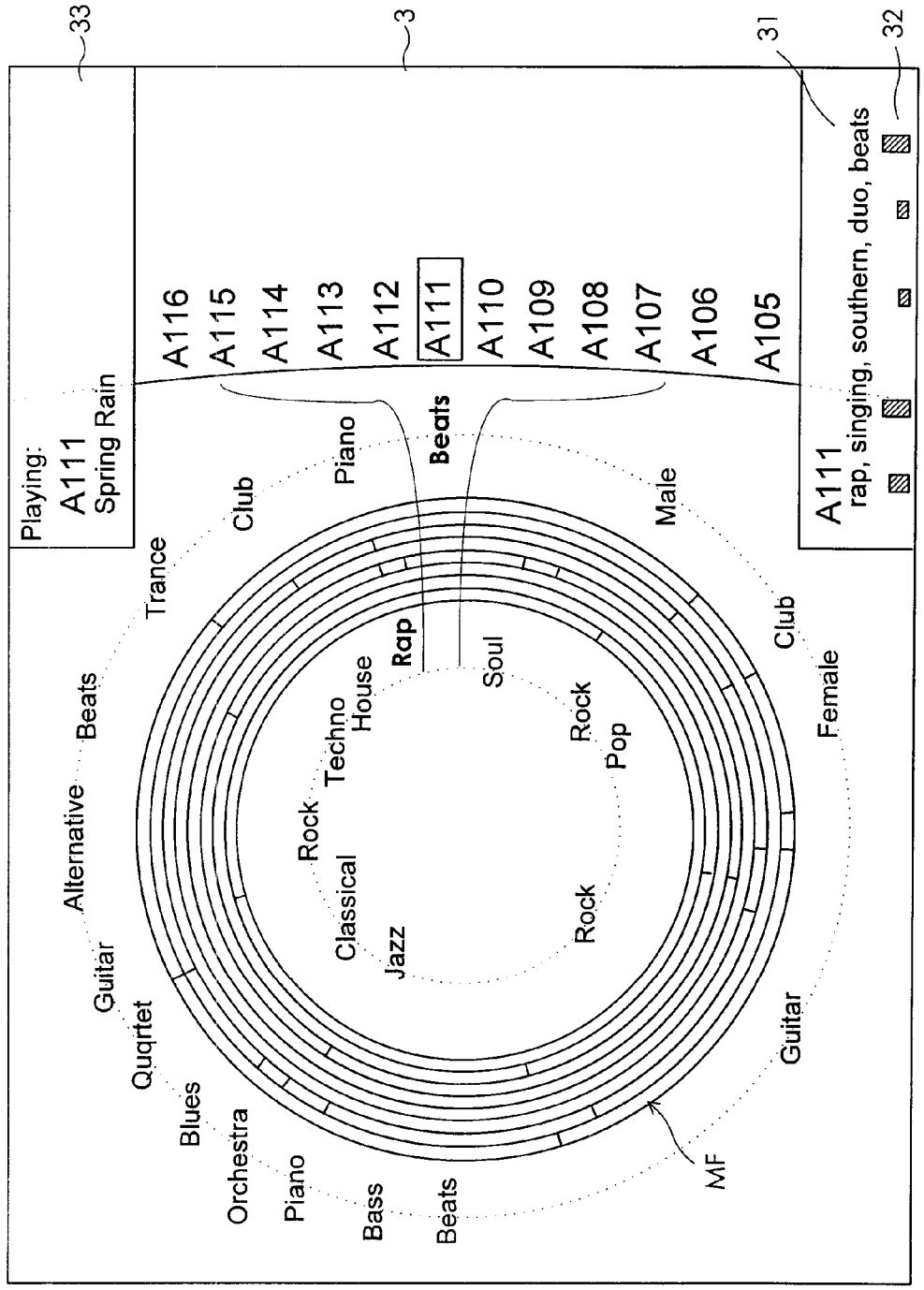
FIG. 3 is a view showing an example of display pattern displayed on the display.

FIG. 2 is a block diagram showing a construction of principal sections and other relevant sections of a retrieval system 11 constructed in the main unit 5 of the music artist retrieval system (hardware 1) according to the present embodiment. FIG. 3 is a view showing an example of display pattern displayed on the display 3. FIG. 2 further includes the display 3 and the rotary selecting section 7 shown in FIG. 1 and also other sections necessary for explaining the system.

The retrieval system 11 of the music artist retrieval system (hardware 1) includes, as roughly classified, a music artist similarity map storing section 13, a music data storing section 15, a similar artists selecting and displaying section 17, a music data playing section 19, a relevant term displaying system 21, a display driving section 23, a speaker drive system 25, and a speaker 27.

The music artist similarity map storing section 13 includes a similarity computing section 131, a map creating section 132, and a map storing section 133 for storing a music artist similarity map created by the map creating section 132. The music artist similarity map storing section 13 computes, for a plurality of music artists, a plurality of similarities between one of the plurality of music artists and the other music artists based on features of the music artists using the similarity computing section 131. The map storing section 133 stores the music artist similarity map for the plurality of music artists created by the map creating section 132 on the basis of the plurality of similarities. The similarity computing section 131 computes the similarity between one of the music artists and another one of the music artists based on distances between a plurality of music data for the one music artist and a plurality of music data for the other one music artist.

Figure 4:
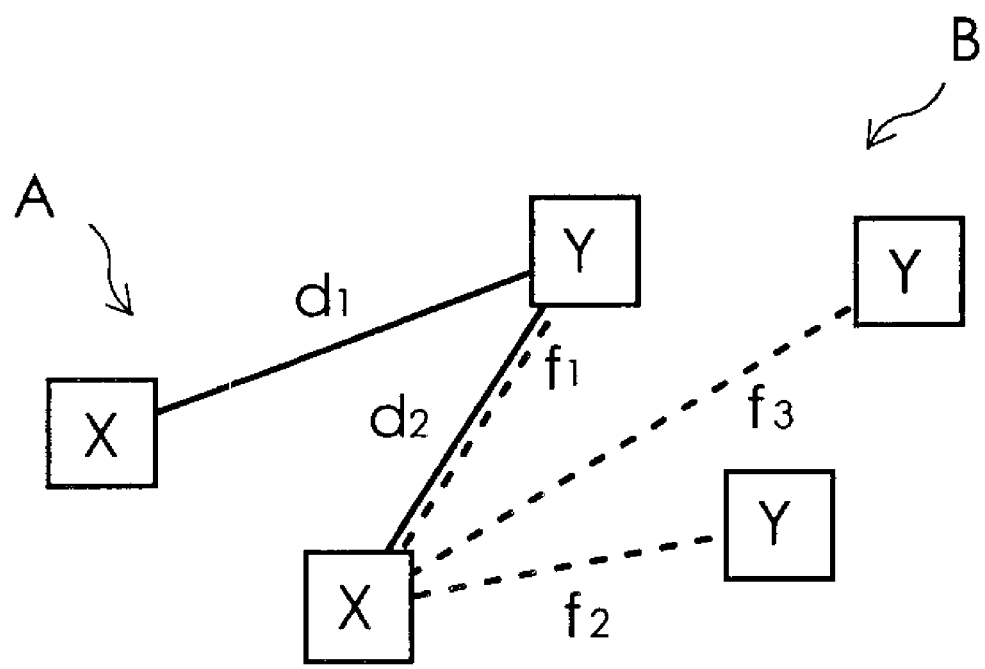
FIG. 4 is a view for explaining how to compute distances.

In the present embodiment, a mean distance value is used to obtain the distance-based similarity. As will be explained with reference to FIG. 4, a first mean value $[d(A, B)=(d1+d2)/2]$ is obtained at first by averaging a plurality of shortest distances d1 and d2 measured from each of the plurality of music data "X" for one music artist "A" to a plurality of music data "Y" for other music artist "B". Next, a second mean value $[d(B, A)=(f1+f2+f3)/3]$ is obtained by averaging a plurality of shortest distances f1, f2 and f3 measured from each of the plurality of music data "Y" for the other music artist "B" to the plurality of music data "X" for the one music artist "A". Finally the first and the second mean values are compared so as to define a larger one as the similarity between the one music artist and the other music artist. With such approach, it is possible to comprehensively obtain the distances between the music data using the plurality of music data "X" of the one music artist and the plurality of music data "Y" of the other music artist "Y", and, moreover, the similarities between the music artists is available with high precision.

Figure 5A:
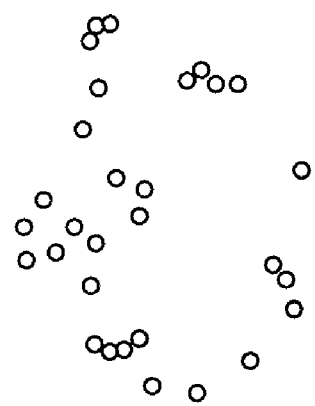
FIGS. 5A to 5C are views for explaining an example of how to create a music artist similarity map.
Figure 5B:
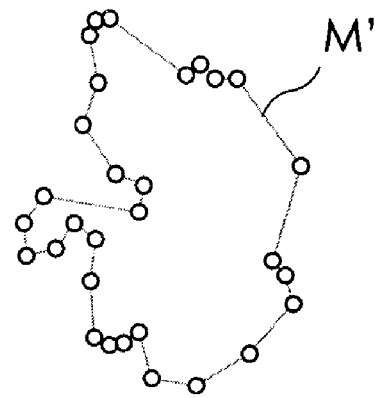
Figure 5C:
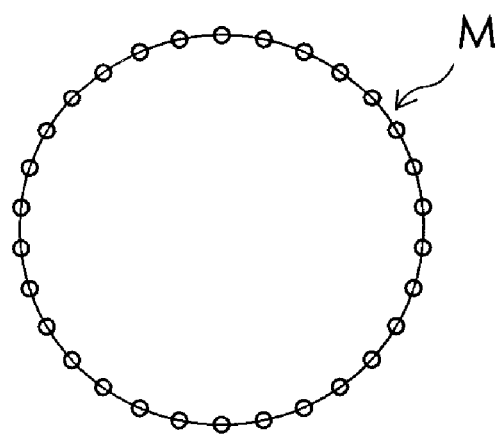

The map creating section 132 creates the music artist similarity map based on the plurality of similarities for the plurality of music artists computed by the similarity computing section 131. An example method for creating the music artist similarity map will be explained hereinbelow with reference to FIGS. 5A to 5C. A plurality of small circles appearing indication in FIG. 5A schematically represents a positional relationship of the respective similarities for the plurality of music artists computed by the similarity computing section 131, as shown on a similarity space. Although only about dozens of artists' similarities are shown in FIG. 5 because of a physical reason, actually, similarities for hundreds or thousands of the music artists are dealt with. In the present embodiment, the music artist similarity map M' is created so that the plurality of similarities shown in FIG. 5A computed for the plurality of music artists may have a relationship unicursally drawn in one continuous line according to a traveling salesman algorithm. Since such music artist similarity map M' as shown FIG. 5B can not be used easily, in the present embodiment, the music artist similarity map M' is arranged in shape to form a music artist similarity map M which is configured in such a manner that the similarities are arranged along a perfect circle line as shown in FIG. 5C. In FIG. 5C, each position of a small circle representing a similarity is defined as a position of a music artist corresponding to the similarity mapped to the music artist similarity map M. Before arranging, as shown in FIG. 5B, the small circles with closer similarities are located in the vicinity of each other. However, in the arranged map M, as shown in FIG. 5C, even small circles with closer similarities may be separated. Accordingly, as will be later explained in detail, when a plurality of terms used as a reference for retrieving a music artist are displayed along a pseudo-map graphic created based on the music artist similarity map M as shown in FIG. 3, a few same terms are located separately in different positions. For example, a term "Beats" is located at three separate positions in a circumferential direction on the outside of the circular pseudo-map graphic as shown in FIG. 3. That is because the plurality of similarities (the plurality of music artists' positions), which are located close to each other before arranging in the music artist similarity map M' of FIG. 5B, are dispersed separately as a result of arranging as shown in FIG. 5C. When the music artist similarity map M forms a closed loop as shown in FIG. 5C, it is possible for the user to reach a desired music artist without fail even when retrieval is carried out in a forward direction or backward direction, therefore retrieval operation becomes easy.

The music data storing section 15 shown in FIG. 2 stores a plurality of music data for each of the plurality of music artists. Since the plurality of music data is stored for each music artist, it is possible to increase not only the computation accuracy of the above-mentioned similarity but also the convenience of the system because the plurality of music pieces can be played. In the present embodiment, the map M is created in the retrieval system 11. However, it is needless to say that the map M may be created on the outside of the retrieval system 11. In that case, the similarity computing section 131 and the map creating section 132 need not to be provided in the retrieval system 11. Incidentally, whether or not the map M is created in the retrieval system 11, the music pieces used for computing the similarity and the music pieces to be played need not to be the same.

The similar artists selecting and displaying section 17 selects, when one music artist is selected from among the plurality of music artists by operation of an initial selecting section 171 or the knob 71 of the rotary selecting section 7, a plurality of music artists whose similarities are close to that of the one music artist, based on the music artist similarity map M. The similar artists selecting and displaying section 17 then displays on the display 3 a plurality of indications corresponding to the one music artist and the plurality of artists whose similarities are close to the one music artist. In FIG. 3, "A111" surrounded by a rectangular box is the artist indication corresponding to the selected one music artist. The other artist indications (artist indications of "A105" to "A116" other than "A111") are a plurality of indications corresponding to the plurality of music artists whose similarities are close to the selected one music artist. In FIG. 3, the artist indications are shown by identification number composed of alphabetical letter and numeric character for the sake of explanatory convenience and protection of personal rights and individual information. However, usually, it is desirable that the artist indications be shown by the names of the music artists for more convenience.

One function of the similar artists selecting and displaying section 17 is to display on the display 3 the artist indication (A111) corresponding to the selected one music artist and the plurality of artist indications corresponding to the plurality of music artists whose similarities are close to that of the one music artist (A105 to A116 other than A111). The function makes it possible for the user to encounter an unknown music artist similar to one music artist. Selection of the plurality of music artists with close similarities are executed based on the music artist similarity map. As a result, similar artists can be retrieved automatically not depending on manual operation. The actual number of the plurality of music artists displayed on the display can be determined arbitrarily. In the present embodiment, twelve artist indications are displayed longitudinally in a row on the display.

To make it possible to select one music artist even at the startup of the system, it is necessary to display plural selectable artist indications on the display 3 even at the beginning. That's why the similar artists selecting and displaying section 17 in present embodiment includes the initial selecting section 171, which initially selects one music artist at random from among the plurality of music artists at the startup of the system. Accordingly, only at the startup of the system, the artist indications of the randomly-selected one music artist and a plurality of music artists similar to the one music artist are displayed on the display 3. It is also possible of course to predetermine one initial music artist to be selected at the beginning instead of randomly selecting the initial one music artist. In the present embodiment, the similar artists selecting and displaying section 17 further includes a specific artist selecting section 172 and a scroll display section 173 in addition to the initial selecting section 171. After the initial selecting section 171 selected the initial one music artist, the specific artist selecting section 172 defines, when one artist indication is selected from among the plurality of indications displayed on the display by operation of an operator, a music artist corresponding to the one selected artist indication as the one music artist selected from among the plurality of music artists. In the present embodiment, the rotary selecting section 7 equipped with the rotary knob 71 that is rotated by the operator is used as a special selecting section operated by the operator as shown in FIG. 1. When the knob 71 is rotated, the rotary selecting section 7 gives a command signal to select an artist indication from among the plurality of indications displayed on the display 3 sequentially in a select direction that is determined depending on a rotating direction of the knob 71. In the present embodiment, to show which indication has been selected right now, the selected artist indication is always displayed on a specific or predetermined position (in FIG. 3, the boxed position surrounded by a rectangular box).

Further, in the present embodiment, the display of the selected artist indication is highlighted (higher in brightness) or made to blink to show which indication has been selected right now. The scroll display section 173 scrollably displays the plurality of artist indications on the display 3. Here, "scrollably display" manner operated by the scroll display section 173 will be described hereinbelow with reference to FIG. 3. When an artist indication "A110" adjacent to the currently-selected artist indication "A111" is selected, an artist indication "A116" displayed at the top of the plurality of indications longitudinally arranged in a row on the display 3 disappears, and the remaining artist indications "A115 to A105" below "A116" are rolled up (moved), then a new artist indication "A104" appears at the bottom end thereof. The scroll display section 173 makes it possible to see a vast amount of artist indications easily even when a screen of the display 3 is small.

In retrieving an unknown music artist, if data useful for retrieval is displayed on the display 3 using relevant terms in addition to the artist indications "A105 to A116", the retrieval becomes easy. Accordingly, the system in the present embodiment is configured to display information such as which type or genre of music, gender of artists, instruments used in the play, and other information such as whether it is a solo or group, as relevant terms on the display 3. To make it possible to display such information, according to the present embodiment, the retrieval system comprises the relevant term displaying system 211 that includes a term data storing section 211, a relevant term display section 212 and a pseudo-map graphic display section 213. The term data storing section 211 stores, for each of the plurality of music artists, term frequency data and/or term weight data obtained on the basis of the term frequency for a plurality of relevant terms corresponding to (paired to) each of the plurality of music artists mapped to the music artist similarity map. The term frequency data and the term weight data obtained on the basis of the term frequency for a plurality of terms are obtained by a term analysis section 214 analyzing a plurality of character information data regarding the music artists. The character information data are obtained from a character information database 215 which includes the plurality of character information data corresponding to the plurality of music artists. Any kind of character information data may be used, and in the present embodiment, the character information database 215 contains data collected through the Internet. Since data collected through the Internet is an electronic data, it can be readily analyzed and is very convenient. Various known technique of automatic keyword extraction can be used for extracting terms from the character information data. In the present embodiment, the known TFIDF method is used for weighting terms based on the term frequency. In the TFIDF method, TFIDF is defined as a product of TF (Term Frequency) and IDF (Inverse Document Frequency), each term is weighted using the TFIDF. The weight by the TFIDF method shall be called "term weight" in the present specification. On the basis of the term weight determined by the TFIDF method, a term weight for a term which appears only in a document data and appears frequently in the document data becomes high. To the contrary, a term which appears in various document data is not weighted (term weight becomes low) because IDF of the term is low value.

The plurality of terms may be predetermined by extracting from among terms retrieved with a publicly known retrieval-by-keyword technique, and may be any kind as far as it is useful in retrieving music artists in particular. However, there are some in the plurality of terms that are very important for retrieval of a music artist such as genre of music, and there are others that are not so useful in the retrieval thereof such as artist's nationality. Accordingly, if the plurality of terms is all analyzed without the term weight, unnecessary analysis work may increase. To prevent such problem, it is preferred that the predetermined plurality of terms is divided into two or more groups according to their weights (importance) as will be described later.

The relevant term display section 212 has a function to display on the display 3, when the initial selecting section 171 or the specific artist selecting section 172 selects one music artist, a term or terms closely associated with the one music artist based on the term weight data regarding the one music artist stored in the term data storing section 211 in such a manner that the term displayed on the display 3 may be identified as being associated with the one music artist. Here, the "term closely associated with the one music artist" is defined in view of whether or not the term is useful in retrieving artists. Since data of term frequency and term weight is already prepared for the plurality of terms, it is the most suitable for the purpose to display top two or more terms with the high term frequency or with the high term weight. In the present embodiment, top two or more terms with the high term weight are displayed to obtain higher retrieval precision.

In the present embodiment, the term data storing section 211 stores term data relating to the plurality of terms that belong to any of the first to third groups for each music artist. The terms belonging to the first group are those that are important as a decisive factor in retrieving a music artist. In the present embodiment, the terms belonging to the first group are composed mainly of those representing a type of music genre such as Rap, Jazz, Soul, etc. For example, in FIG. 3, eight terms "Rock", "Techno", "House", "Rap", "Pop", "Jazz", "Classical", and "Soul", which are displayed on the inside of a pseudo-map graphic MF constituted from eight concentric circle indications, are the terms belonging to the first group. In order to decide to display the above eight terms, in the present embodiment, fifty terms are extracted in advance as the first group and analyzed. Then the top eight terms with the high term weight are displayed on the inside of the pseudo-map graphic MF.

Figure 6A:
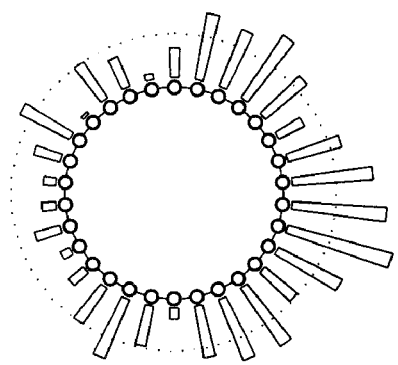
FIGS. 6A to 6C are views for explaining how to determine a labeling position for a term with high term frequency.

Next, how to determine the display position of the terms with high term frequency will be described with reference to FIG. 6. The pseudo-map graphic MF displayed on the display 3 by the pseudo-map graphic display section 213 is a closed-loop pseudo-map graphic in which positions of the plurality of music artists are mapped on along the closed-loop based on the music artist similarity map M as explained using FIG. 5. In the present embodiment, the basic configuration of the pseudo-map graphic MF is eight concentric circle indications, as shown in FIG. 3. The eight concentric circle indications corresponding to the above-mentioned top eight terms one-to-one. FIG. 6A is used to explain how to obtain data for showing the display position of a term and its term weight. A plurality of small circles shown in FIG. 6A represents positions of similarities for the music artists (corresponding to the positions of the music artists). Rectangular figures disposed on the outer side of the plurality of small circles represent the magnitude of the term weights of a specific terms corresponding to the music artists. The longer the rectangular figure is, the higher the term weight is for the corresponding music artist. For example, assume a case that the specific term is "Rock". As shown in FIG. 6A, there are some areas in which the term weight of the term "Rock" is higher, and other areas in which the term weight thereof is lower, and both areas are coexisted disorderly. Such phenomenon is due to the fact that in the course of creating the music artist similarity map M, a plurality of rock artists located close to each other in FIG. 5B are dispersed separately in FIG. 5C as already described. When rock artists are dispersed or exist separately in a plurality of areas on the music artist similarity map M, the terms "Rock" need to be displayed on the areas separately.

Figure 6B:
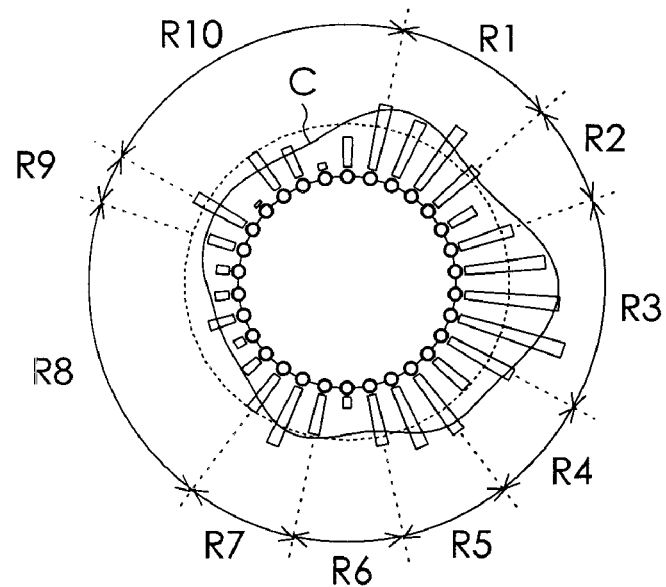

In the present embodiment, the outermost circle indication of the eight concentric circle indications forming the pseudo-map graphic MF is related to "Rock", and the other seven circle indications are respectively related to the remaining seven terms one-to-one. In the present embodiment, the pseudo-map graphic display section 213 further implements the following two functions. The first function is to smooth the term weights for one specific term such as "Rock", to classify them into a plurality of weight levels so that the circle indication related to the specific term may be composed of or divided into a plurality of segment regions (R1 to R10 in this case) corresponding to the plurality of weight levels, as shown in FIG. 6B. To determine the segment regions in which the specific term ("Rock" in this case) should be displayed, the segment regions R1, R3 and R5, in which a smoothed curved line C exceeds a predetermined reference weight level (illustrated as a dotted line) as shown in FIG. 6B, are defined as the segment regions of the term "Rock." The relevant term display section 212 displays the term "Rock" with respect to the segment regions R1, R3, and R5 in FIG. 3. With regard to the other seven terms as well, the relevant term display section 212 determines segment regions in which the terms should be displayed based on the data stored in the term data storing section 211 in the same manner as stated above, and displays the terms with respect to the determined segment regions on the display 3. The number of the segment regions need not be always the same because it may change depending on a state of distribution of the term weights.

Figure 6C:
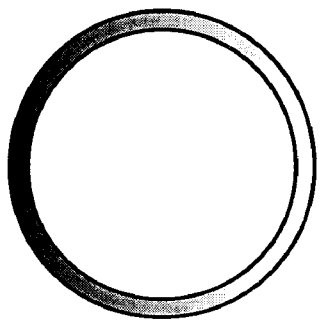

The second function of the pseudo-map graphic display section 213 is, according to the present embodiment, to discriminate the weight levels using a difference in brightness and/or chromaticity across the plurality of segment regions. FIG. 6C shows an example in which the weight levels of the segment regions R1 to R10 in FIG. 6(B) are discriminated by way of difference in brightness across the plurality of segment regions. As shown in FIG. 6C, difference in brightness becomes more indistinguishable as the number of the segment regions increases. Accordingly, it is preferred that the number of the segment regions is suitably limited to a distinguishable extent. In addition, in the present embodiment, the eight circle indications are displayed in eight different colors respectively.

Figure 7A:
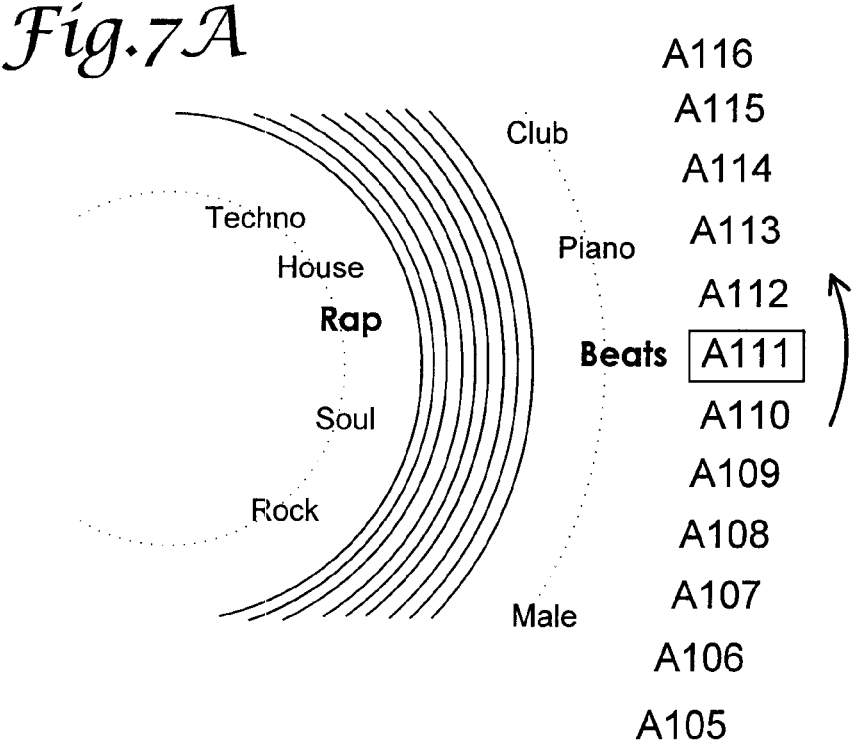
FIGS. 7A and 7B are views showing an example of how the display indications are moving and changed on the display in the course of retrieving operation.
Figure 7B:
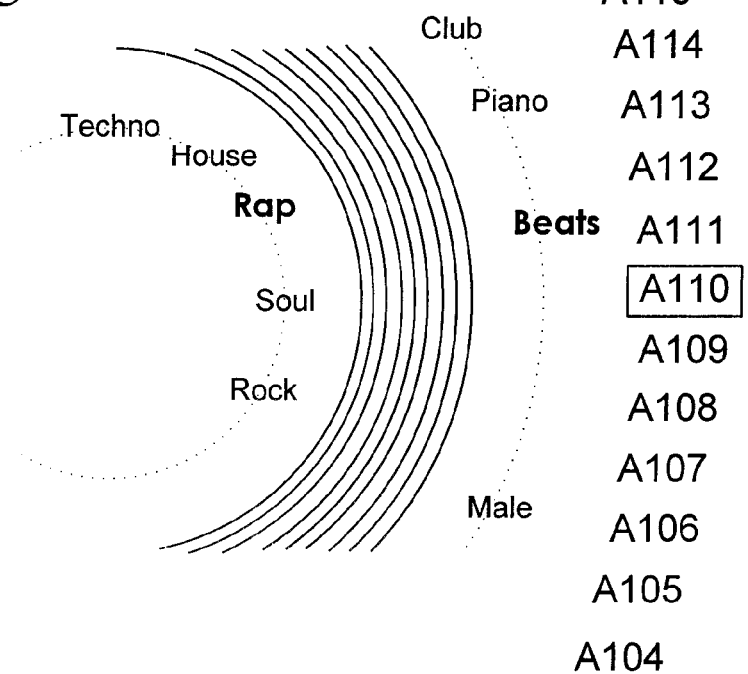
Figure 8:
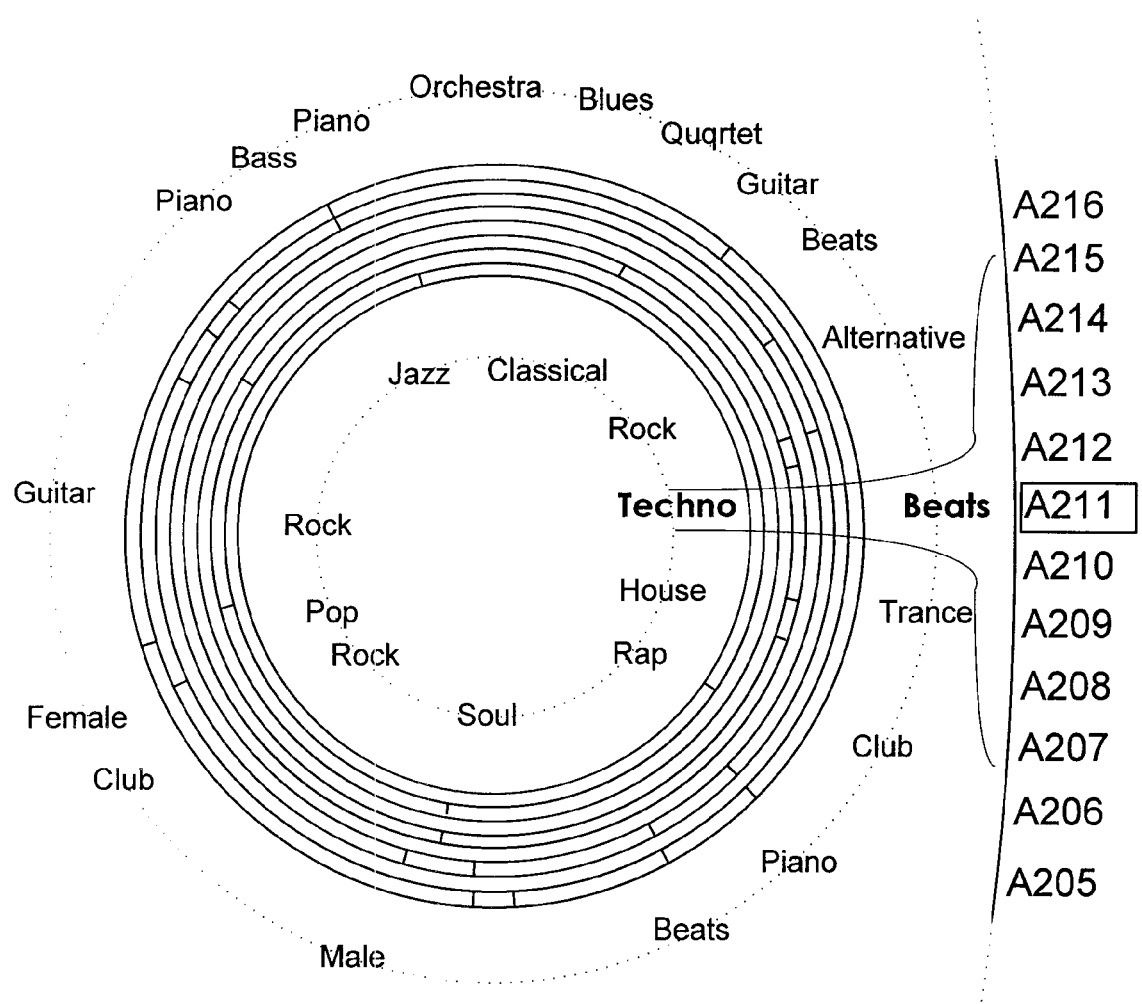
FIG. 8 is a view showing another example of how the display indications are moving and changed in the course of retrieving operation.

In the present embodiment, the pseudo-map graphic display section 213 displays the pseudo-map graphic MF so that a display position of the artist indication of the selected one music artist displayed on the display may always be consistent with a mapped portion (position) of the one music artist mapped to the pseudo-map graphic. The pseudo-map graphic display section 213 further has a third function to rotate the display of the pseudo-map graphic MF in conjunction with the scrolling display of the artist indications operated by the similar artists selecting and displaying section 17 so that the indication position (position of "A111" in FIG. 3) of the selected artist indication (selected one music artist) displayed on the display 3 by the similar artists selecting and displaying section 17 may always be consistent with a mapped position of the selected one music artist mapped to the pseudo-map graphic. More specifically, when the scrolling display of the artist indications is scrolled by one indication (by one music artist), the pseudo-map graphic MF is also rotated by a given angle for one music artist, as shown in FIGS. 7A and 7B. As a result, a music artist currently displayed on the display position of the selected one artist indication as shown in FIG. 3 and a music artist mapped to the pseudo-map graphic MF at a portion opposed to the above-mentioned display position are the same one. The display of terms also rotates by the given angle for one artist as shown in FIG. 7. FIG. 8 shows an image of display indicated on the display 3 after a large amount of the scrolling has been made.

The relevant term display section 212 further has a function to move the display position of the terms displayed adjacent to the pseudo-map graphic MF in conjunction with the rotation of the pseudo-map graphic MF. In this manner, it becomes possible to always display a term related to the selected one artist indication at a position which helps the user recognize that there is a relationship between the term and the selected one artist indication.

If the term frequency of a term corresponding to a circle indication can be known by difference in brightness in the color of the circle indication constituting the pseudo-map graphic MF as mentioned above, there is an advantage as mentioned below. Namely, when the pseudo-map graphic and the displayed terms are rotated in conjunction with the scrolling display of the artist indications, and scrolling speed (change or renewal of the artist indications to be displayed) becomes fast, it becomes difficult for the user to distinguish the terms. However, if the user remembers the relationship between terms and colors, the user can find where is the music artist of a desired genre of music depending on the brightness of a related color (depending on a highlighted segment in the related color). As a result, there is an advantage that high-speed retrieval becomes possible.

In the present embodiment, the term data storing section 211 further stores the term frequency data and term weight data of the term frequency and term weight of a plurality of terms belonging to the second group, and the term frequency data and term weight data of the term frequency and term weight of a plurality of terms belonging to the third group. The data of the term frequency and term weight of a plurality of terms belonging to the second group is considered to be less important than that of the first group but may be available as a decisive factor in the retrieval. The data of the term frequency and term weight of a plurality of terms belonging to the third group is considered to be a group of terms related to the plurality of music artists. The plurality of terms belonging to the second group include a name of instruments played, artist's gender, terms indicative of sound quality, terms explaining whether the artist is a group or solo, and terms explaining whether the play is orchestra or not. The plurality of terms belonging to the third group includes terms belonging to the first and second groups and other relevant terms. In the present embodiment, as well as the top two or more terms belonging to the first group, top two or more terms, with the high term weight among the plurality of terms belonging to the second group are displayed along the outside of the pseudo-map graphic MF as shown in FIG. 3. In the example of FIG. 3, top twelve terms with the high term weight ("Male", "Female", "Club", "Beats", "Piano", "Guitar", "Orchestra", "Bass", "Quartet", "Alternative", "Blues", "Trance") are selected from among the second group and displayed. The display position of the two or more terms belonging to the second group is determined in the same manner as that of the top two or more terms belonging to the first group. The display position of the two or more terms belonging to the second group is moved in conjunction with the rotation of the pseudo-map graphic MF similar to the display position of the two or more terms belonging to the first group. Since the plurality of terms belonging to the first and second groups is displayed separately on the inside and outside of the pseudo-map graphic MF as in the present embodiment, much more information can be suitably displayed in such a manner that importance of the information may be distinguishable by the display position thereof. As a result, retrieval of unknown music artists becomes much easier.

In the present embodiment, to help the user understand which the term is corresponding to the selected one artist (artist indication) at a glance, display of the term corresponding, to the music artist is highlighted. In FIG. 3, highlighted terms are shown in boldface characters. It is needless to say that the terms may be made to blink or differ in color to help the user understand that the terms are related to the selected one artist (artist indication) instead of increasing brightness.

The display 3 is driven and controlled by a driving signal from a display driving section 23. The display driving section 23 controls the screen information on the display 3 by inputting signals from the scroll display section 173, the relevant term display section 212, and a similarity map displaying section 213.

In FIG. 3, the top two or more terms with the high term weight belonging to the third group are displayed on a display region 31 at the bottom right on a screen of the display 3. In the display region 31 is described with the name of the selected artist indication, the terms with the high term weight among the plurality of terms belonging to the third group. There are also bar indications 32 shown on the display 3 corresponding to the terms described therein, of which height dimensions are proportional to the magnitude of the term weight of the corresponding terms. The two or more terms described in the display region 31 are also used as auxiliary information for the user in addition to the two or more terms belonging to the first and second groups.

With such pseudo-map graphic display section 213 and relevant term display section 212, it is possible to display the plurality of terms useful as auxiliary information in retrieving artists and the terms closely related to the selected one artist indication in synchronization with the selection of artist indication and change of the artist indications to be displayed, in addition to and separately from the artist indications (A105-A116 of FIG. 3), on the display. As a result, it is possible for the user to retrieve a desired unknown music artist in a short time out of vast amounts of artists using as reference the plurality of terms described on the display 3.

In the present embodiment, the music data playing section 19 is provided. When one artist indication (A111 in the case of FIG. 3) is selected form the plurality of indications (A105-A116) displayed on the display 3 and a play command is inputted, the music data playing section 19 extracts one or more music data of the music artist related to the selected artist indication from the plurality of music data stored in the music data storing section 15 and reproduces or plays them. At the same time that the music data playing section 19 plays the one or more music data of the music artist related to the selected artist indication, a name of the artist corresponding to the selected one artist indication (A111 in the case of FIG. 3) and a title of the currently playing music (music data) are described in the display region 33 in the upper right of the display 3 as shown in FIG. 3. In the present embodiment, a push switch structure in which the knob 71 is used as a keytop of the rotary selecting section 7 is built in the rotary selecting section 7. Selection of an artist indication is conducted by turning the knob 71, and play command is inputted by pushing the knob 71. When the knob 71 is pushed, the music data playing section 19 extracts a music data from the plurality of music data stored in the music data storing section 15, plays it, and drives a speaker 27 by the speaker drive system 25. It is optional which music data is extracted and played from among the plurality of music data.

Figure 9:
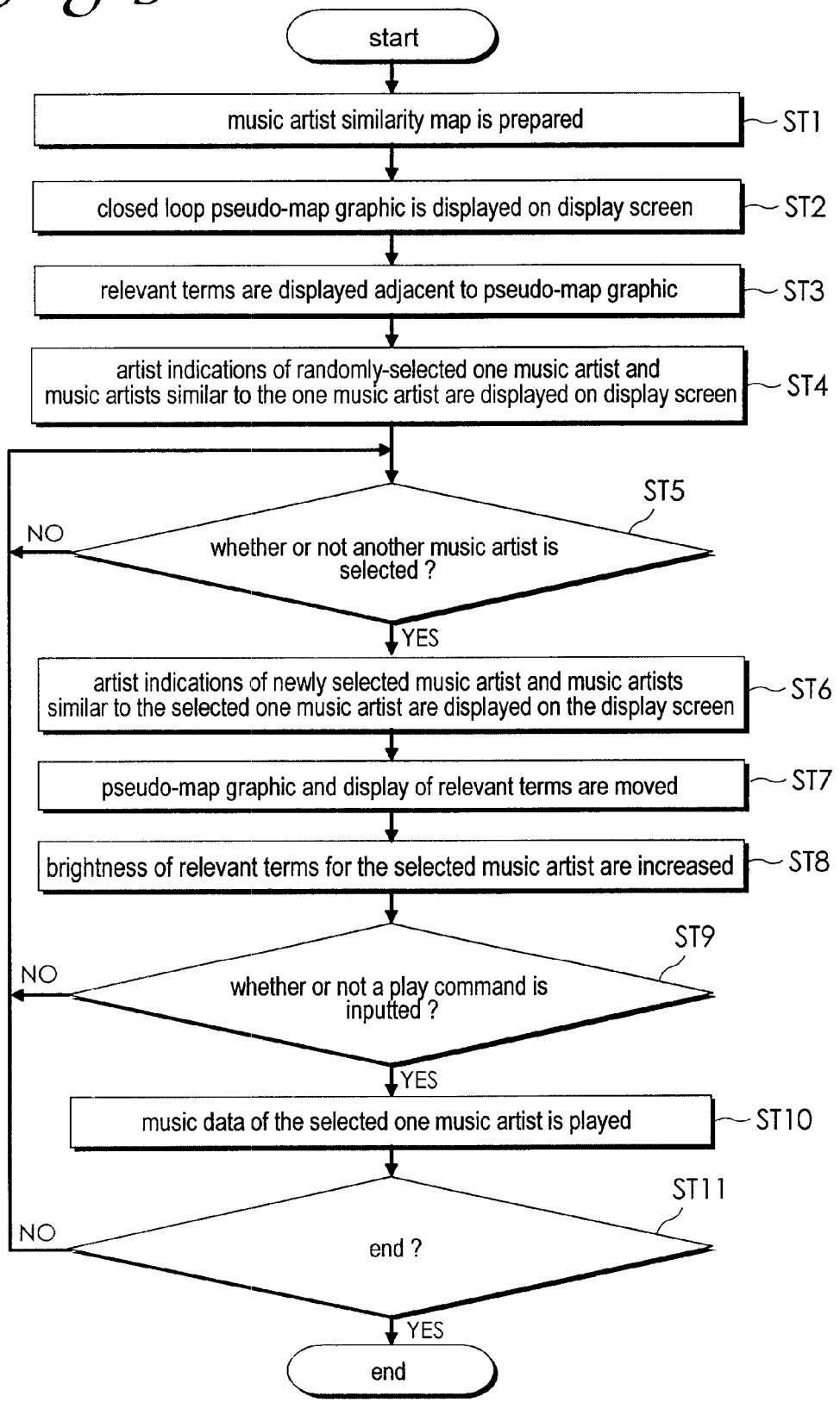
FIG. 9 is a flowchart showing an example of software algorithm used for implementing the artist retrieval system appeared in FIG. 2 using a computer.
Figure 10:
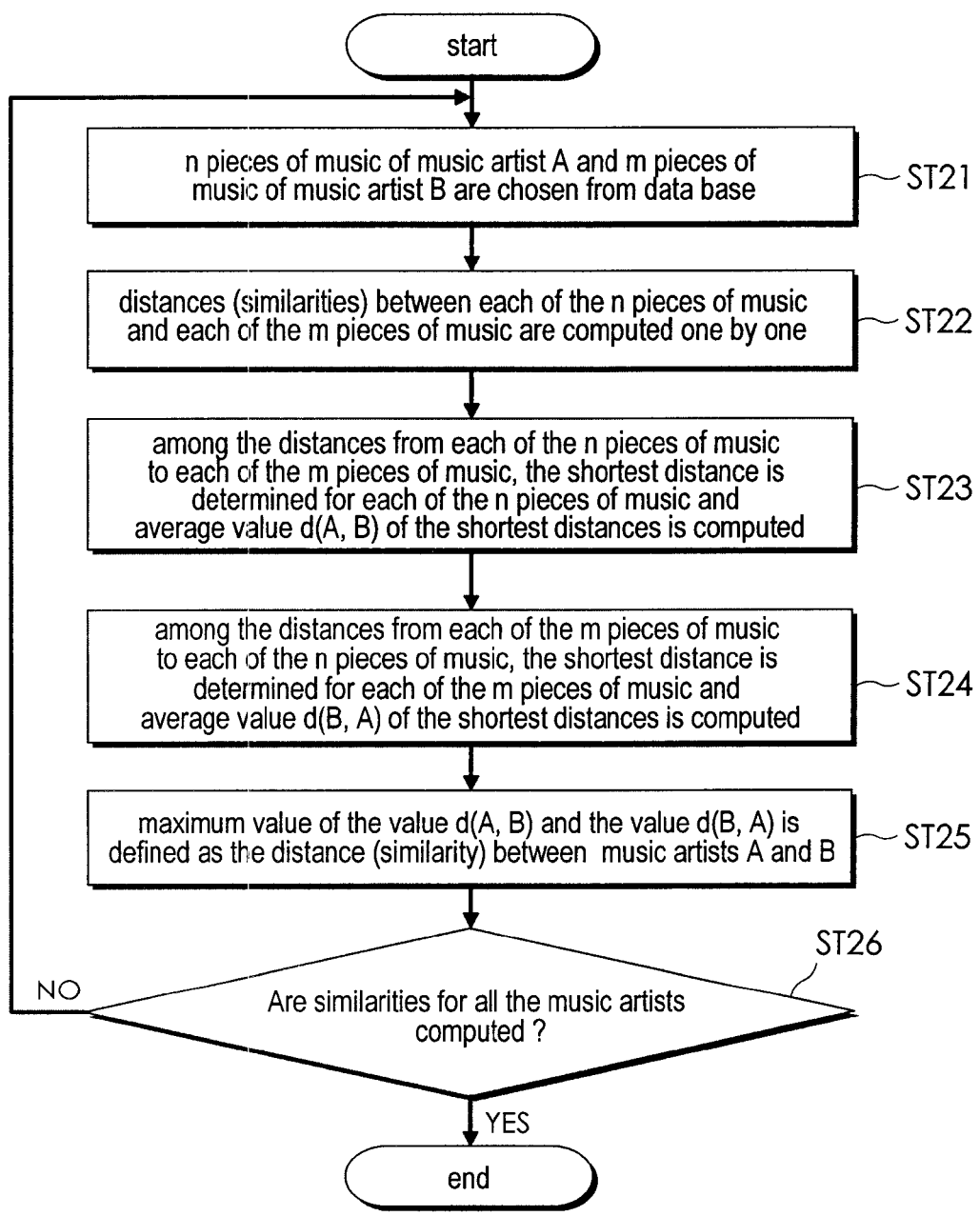
FIG. 10 is a flowchart showing an algorithm used for computing similarities of a plurality of music artists.

FIG. 9 is a flow chart showing an example of software algorithm used when implementing the artist retrieval system of FIG. 2 or the method of the present invention using a computer. First, a music artist similarity map is prepared in step ST1. For preparation of the music artist similarity map, similarity of the plurality of music artists is computed according to the algorithm shown in FIG. 10. In computation of the similarity of each music artist, first, in step ST21 as shown in FIG. 10, n pieces of music of a music artist A and m pieces of music of a music artist B are chosen from data base. In step ST22, the distances (similarities) between each of the n pieces of music and each of the m pieces of music are computed. In step ST23, among the distances from each of the n pieces of music to the m pieces of music, the shortest distance is determined for each of the n pieces of music. Then, an average value d(A, B) of the shortest distances is computed. In step ST24, among the distances from each of the respective m pieces of music to the n pieces of music, the shortest distance is determined for each of the m pieces of music. Then, an average value d(B, A) of the shortest distances is computed. In step ST25, the maximum value of the value d(A, B) and the value d(B, A) is selected and that is defined as the similarity between the music artists A and B. The steps from ST21 to ST26 are repeated until the mutual similarities for all the music artists have been computed. The music artist similarity map is formed using the above computed similarities, according to the procedure shown in FIG. 5. The music artist similarity map may be created independently.

Figure 11:
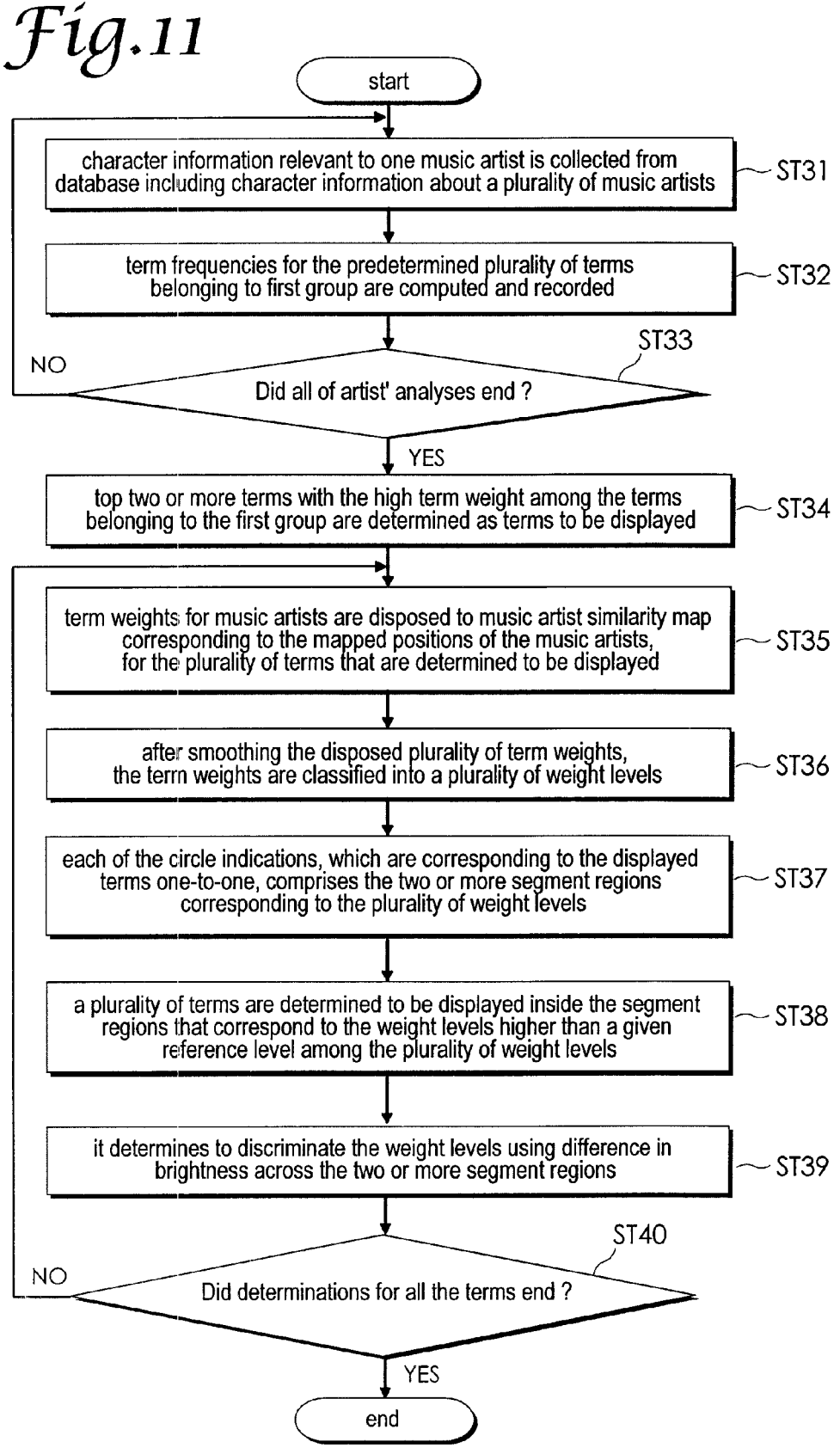
FIG. 11 is a flowchart for determining a plurality of terms from among a plurality of terms belonging to a first group to be displayed along the inner circumference of a pseudo-map graphic.
Figure 12:
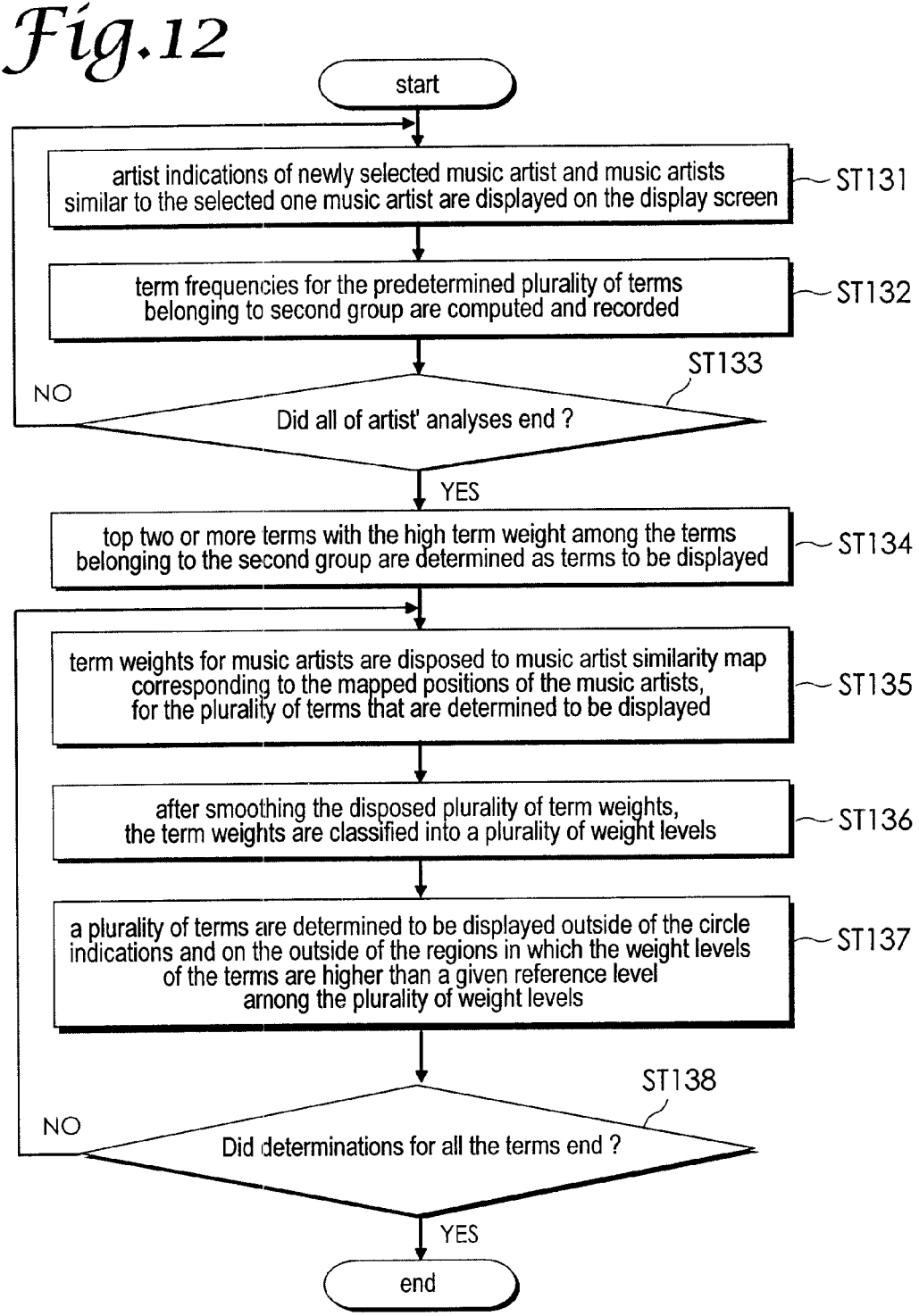
FIG. 12 is a flowchart for determining a term from among a plurality of terms belonging to a second group to be displayed on the display.

After the music artist similarity map is prepared, the step proceeds to step ST2. In step ST2, the closed loop pseudo-map graphic is displayed on the display based on the music artist similarity map. In step ST3, relevant terms are displayed adjacent to the pseudo-map graphic. To display the pseudo-map graphic and the relevant terms, it is necessary to obtain term data in advance and determine which term should be displayed. FIGS. 11 to 13 are flow charts showing software algorithms used when determining which term should be displayed among the plurality of terms belonging to the above-mentioned first to third groups.

FIG. 11 is a flow chart for determining the two or more terms which are most important ones belonging to the first group, to be displayed inside the pseudo-map graphic MF of FIG. 3. In step ST31, character information relevant to one music artist is collected at first from a database including character information about the plurality of music artists. In step ST32, term frequencies for the predetermined plurality of terms belonging to the first group are computed and recorded. After all the steps of ST31 and ST32 are completed with respect to all the prepared artists (step ST33), the step proceeds to step ST34. In step ST34, the magnitudes of term weights for the terms belonging to the first group are computed based on the term frequencies, and top two or more terms with the high term weight are determined to be displayed on the display in advance.

Next, in step ST35, the term weights, which are obtained based on the term frequencies for the music artists, are disposed to the music artist similarity map corresponding to the mapped positions of the music artists (pair the term weight and the mapped position of the music artist one-to-one), for the plurality of terms that are determined to be displayed in step ST34. In step ST36, after smoothing the disposed plurality of term weights, the term weights are classified into a plurality of weight levels. In step ST37, each of the circle indications, which are corresponding to the displayed terms, is divided into the two or more segment regions corresponding to the plurality of weight levels. In step ST38, it is determined that the plurality of terms are displayed inside the segment regions that correspond to the weight levels higher than a given reference level among the plurality of weight levels. In step ST39, it determines to discriminate the weight levels using difference in brightness across the two or more segment regions. There is no problem even if execution sequence of step ST38 and step ST39 is reversed. In step ST40, after the above-mentioned determinations have been completed for all the terms, the algorithm is completed.

FIG. 12 is a flow chart for determining which term should be displayed on the display among the plurality of terms belonging to the second group. Description of steps ST131 to ST136 in FIG. 12 will be omitted because they are the same as steps ST31 to ST36 in FIG. 11. The terms with high term weight, which are determined to be displayed among the plurality of terms belonging to the second group, are not directly related to the eight circle indications of the pseudo-map graphic. Accordingly, in step ST137, it is determined that the terms are displayed on the outside of the circle indications and the outside of the regions in which the weight levels of the terms are higher than a given reference: level among the plurality of weight levels. In step ST138, after the determinations have been completed for all the terms, the algorithm is completed.

FIG. 13 is a flow chart for determining which term should be displayed on the display among the plurality of terms belonging to the third group. Description of steps ST231 to ST233 in FIG. 13 will be omitted because they are the same as steps ST31 to ST33 of FIG. 11. In FIG. 13, when one music artist is selected in step ST234, the top two or more terms with the high term weights for the selected one music artist are determined as terms to be displayed. Then the algorithm is completed. Description of the top two or more terms with the high term weight obtained based on the term frequencies, which have been selected from among the plurality of terms belonging to the third group, are changed whenever another music artist has been selected. Therefore, the step ST234 is repeatedly executed each time when a new music artist has been selected.

In FIG. 9 again, at the startup of the system, one music artist is selected at random and the artist indications of the randomly-selected one music artist and a plurality of music artists similar to the one music artist are displayed on the display. In step ST5, it is determined whether or not another music artist has been selected, and when another one music artist has been selected, the step proceeds to step ST6. In step ST6, the artist indications of a newly selected one music artist and a plurality of music artists similar to the newly selected one music artist are displayed on the display (change of the artist indications to be displayed). In step ST7, the pseudo-map graphic and display of the relevant terms (only as for the terms belonging to the first and second groups) are moved in conjunction with the change of the artist indications on the display. In step ST8, brightness of relevant terms (only as for the terms belonging to the first and second groups) for the selected music artist are increased. As for the terms to be displayed, which are belonging to the third group, brightness is not increased in particular. Substantially, the steps ST6 to ST8 are executed simultaneously. In step ST9, it is determined whether or not a play command has been inputted. If the play command has been inputted, a music data of the selected one music artist is played in step ST10. When completion of the algorithm is not determined in step ST11, the step returns to step ST5. When completion thereof has been determined, retrieval operation is terminated.

According to the above-mentioned embodiment, the pseudo-map graphic and the relevant terms are displayed together with the plurality of artist indications. However, only the plurality of artist indications may be displayed, or only the plurality of artist indications and relevant terms may be displayed without the pseudo-map graphic, When the pseudo-map graphic is omitted, display of the relevant terms may be arranged in a row as well as the display of the artist indications. According to the above-mentioned embodiment, the pseudo-map graphic is comprised of two or more concentric circles. However, it may not be limited to that. For example, the pseudo-map graphic may be comprised of a single circle indication instead of the plurality of circle indications. Furthermore, in the above-mentioned embodiment, a closed loop structure is employed for the map. However, it is needless to say that the pseudo-map graphic may be configured in the form of a straight line, or any other configuration is available.

INDUSTRIAL APPLICABILITY

According to the present invention, both of one artist indication corresponding to a music artist selected by an operator and artist indications corresponding to a plurality of music artists similar to the one selected music artist are automatically and selectively displayed on a display. In this manner, there is an advantage that allows the user to easily retrieve an unknown music artist similar to user's favorite artist. There is another advantage that the music data playing section makes it possible to play and confirm a music of the retrieved unknown artist at once, thereby extremely enhancing the convenience.

The invention claimed is:

1. A music artist retrieval system comprising:
a music artist similarity map storing section that computes a plurality of similarities for a plurality of music artists, the similarity being computed between one of the plurality of music artists and other music artists based on features of the music artists, and creates a music artist similarity map for the plurality of music artists based on the plurality of similarities thus computed and stores the music artist similarity, the music artist similarity map storing section including:
a similarity computing section that computes the similarity between one of the music artists and another one of the music artists based on distances between the plurality of music data for the one music artist and the plurality of music data for the other one music artist;
a map creating section that creates the music artist similarity map based on the plurality of similarities for the plurality of music artists computed by the similarity computing section, the map creating section creating the music artist similarity map so that the plurality of similarities computed for the plurality of music artists may have a relationship unicursally drawn in one continuous line according to a traveling salesman algorithm; and
a map storing section that stores the music artist similarity map created by the map creating section;
a music data storing section that stores a plurality of music data for each of the plurality of music artists;
a similar artists selecting and displaying section that, when one music artist is selected from among the plurality of music artists, selects a plurality of music artists whose similarities are close to the similarity of the one music artist, based on the music artist similarity map, and displays on a display a plurality of artist indications corresponding to the one music artist and the plurality of music artists whose similarities are close to the similarity of the one music artist, the similar artists selecting and displaying section including:

an initial selecting section that initially selects one predetermined or randomly-selected music artist from among the plurality of music artists at a startup of the system; and a specific artist selecting section that, when one artist indication is selected with an operation of an operator from among the plurality of artist indications displayed on the display after the initial selecting section has initially selected the one music artist, determines one music artist corresponding to the one selected artist indication as the one music artist selected from among the plurality of music artists;

a music data playing section that, when one of the plurality of artist indications displayed on the display is selected and then a play command is inputted, extracts at least one music data of the music artist corresponding to the selected artist indication from the plurality of music data stored in the music data storing section, and plays the at least one music data, a term data storing section that stores term data corresponding to the plurality of music artists mapped to the music artist similarity map, the term data being obtained by computing, for each of the plurality of music artists, a term frequency or a term weight defined on the basis of the term frequency in respect of a plurality of predetermined terms in connection with artists and music pieces, picked up from among a plurality of character information data regarding the plurality of music artists;

a relevant term display section that displays on the display a term closely associated with the one music artist based on the term data regarding the one music artist stored in the term data storing section in such a manner that the term displayed on the display may be identified as being associated with the one music artist, when the initial selecting section or the specific artist selecting section selects the one music artist; and a pseudo-map graphic display section that displays on the display a closed-loop pseudo-map graphic in which positions corresponding to the plurality of music artists are mapped based on the music artist similarity map, and moves the pseudo-map graphic in conjunction with a movement of the plurality of artist indications displayed by the similar artists selecting and displaying section so that a display position of the artist indication of the one music artist displayed on the display by the similar artists selecting and displaying section may always be consistent with a position of the one music artist mapped to the pseudo-map graphic, wherein the term data storing section stores at least the term data relating to a plurality of terms belonging to a first group, which are considered to be important as a decisive factor in selecting a music artist, and the term data relating to a plurality of terms belonging to a second group, which are considered to be less important than the plurality of terms belonging to the first group but may be usable as a decisive factor; and wherein the relevant term display section displays the top two or more terms having the high term frequency or the high term weight among the plurality of terms belonging to the first group as well as the top two or more terms having the high term frequency or the high term weight among the plurality of terms belonging to the second group in the vicinity of the pseudo-map graphic in consideration of the positions of the plurality of music artists mapped to the pseudo-map graphic, and moves the display of the term in conjunction with the movement of the pseudo-map graphic.

2. The music artist retrieval system according to claim 1, wherein the similarity computing section computes a first average value by averaging a plurality of shortest distances measured from each of the plurality of music data for the one music artist to the plurality of music data for the other one music artist, as well as a second average value by averaging a plurality of shortest distances measured from each of the plurality of music data for the other one music artist to the plurality of music data for the one music artist, and then determines a larger one of the first and the second average values as the similarity between the one music artist and the other one music artist.

3. The music artist retrieval system according to claim 1, wherein the specific artist selecting section includes a rotary selecting section equipped with a rotary knob to be turned by the operator.

4. The music artist retrieval system according to claim 1, wherein
the relevant term display section displays top two or more terms having the term frequency or the term weight which is higher than those of other terms among the plurality of terms belonging to the first group as well as top two or more terms having the term frequency or the term weight which is higher than those of other terms among the plurality of terms belonging to the second group, and increases the brightness of the term, or changes the color of the term, or blinks the term so that the term may be identified as being associated with the one music artist.

5. The music artist retrieval system according to claim 4, wherein
the term data storing section stores term data regarding the term frequency or the term weight for a plurality of terms belonging to a third group, which are considered to be associated with the plurality of music artists; and
the relevant term display section displays a term associated with the one music artist as a reference term on the display separately from terms belonging to the first and second groups, based on the term data of the plurality of terms belonging to the third group.

6. The music artist retrieval system according to claim 1, wherein
the closed-loop pseudo-map graphic is constituted from concentrically disposed circle indications of which the number is the same as the number of the top two or more terms belonging to the first group;
the top two or more terms corresponds to the two or more concentrically disposed circle indications, respectively; and
the pseudo-map graphic display section smoothes the term frequencies or the term weights for the top two or more terms and classifies them into a plurality of levels; constructs the circle indications corresponding to the terms from a plurality of segment regions corresponding to the plurality of levels; and indicates the plurality of levels by using a different brightness and/or chromaticity for each segment region.

7. The music artist retrieval system according to claim 1, wherein the character information data include data collected via the Internet.

* * * * *